United States Patent [19]
Hansen

[11] 3,917,787
[45] Nov. 4, 1975

[54] METHOD OF MAKING A SLIDE-FASTENER COUPLING ELEMENT

[75] Inventor: Harry Hansen, Copenhagen-Valby, Denmark

[73] Assignee: Opti-Holding AG, Glarus, Switzerland

[22] Filed: Nov. 16, 1973

[21] Appl. No.: 416,451

[30] Foreign Application Priority Data
Nov. 16, 1972 Germany.......................... 2256095

[52] U.S. Cl. ............... 264/146; 264/163; 264/167; 264/210 R; 425/814
[51] Int. Cl.² ......................................... B28B 11/16
[58] Field of Search .......... 264/146, 167, 174, 320, 264/166, 294, 334; 425/114, DIG. 34, 109, 110, 126 R, 129, 122

[56] References Cited
UNITED STATES PATENTS

| | | | |
|---|---|---|---|
| 3,192,298 | 6/1965 | Fisher | 264/167 |
| 3,270,408 | 9/1966 | Nealis | 264/320 |
| 3,354,853 | 11/1967 | Haussmann | 264/346 |
| 3,422,648 | 1/1968 | Lemelson | 264/174 |
| 3,445,915 | 5/1969 | Cuckson et al. | 264/146 |
| 3,590,109 | 6/1971 | Doleman et al. | 264/167 |
| 3,608,035 | 9/1971 | Frohlich | 264/174 |

*Primary Examiner*—Jay H. Woo
*Attorney, Agent, or Firm*—Karl F. Ross; Herbert Dubno

[57] ABSTRACT

An extruded synthetic-resin strand of uniform and homogeneous cross section is fed at a temperature above its glass-transition temperature to the nip of a pair of shaped rolls which have matching die formations that press the strand into a shape with a succession of coupling heads. Thereafter the shaped strand is passed through thermal-treatment chambers wherein it is thermofixed by heating and cooling. A continuous loop of steel wire is passed between the rolls and through the treatment chambers. This wire is imbedded in (pressed into) the strand at the pressing station and is separated from the strand downstream of the treatment chambers so that the wire acts as a support for the strand and serves to free it from the die formations in the pressing rolls.

4 Claims, 6 Drawing Figures

METHOD OF MAKING A SLIDE-FASTENER COUPLING ELEMENT

FIELD OF THE INVENTION

The present invention relates to a method of and apparatus for making a continuous slide-fastener coupling element. More particularly this invention concerns a system for shaping a continuous synthetic-resin monofilament into a slide-fastener coupling element.

BACKGROUND OF THE INVENTION

It is known in the production of slide fasteners to start with an extruded synthetic-resin monofilament which may be appropriately profiled. Teeth are formed on this strand by squeezing it between successive pairs of matching die members which move in closed paths one behind the other.

The strand is extruded into the nip formed at one end of the die arrangement and is very difficult to remove from the forming instrument. With extremely fine coupling elements it is almost impossible to use such a system, as the molded coupling element cannot be reliably pulled out of the dies.

The only possible method of overcoming this difficulty has been to extrude the strand around a metal wire or band which is later separated from the formed element. The extrusion of a strand of heterogeneous cross section requires an expensive extrusion apparatus. In addition the nonextensible metal element is generally discarded, which further increases the overall cost of the finished product.

OBJECTS OF THE INVENTION

It is therefore an object of the present invention to provide an improved method of making a continuous slide-fastener coupling element.

Another object is the provision of a system for making such a coupling element which is simple and reliable, so that the finished product remains relatively inexpensive.

A further object is to provide a method applicable to the production of coupling elements of extreme fineness.

SUMMARY OF THE INVENTION

These objects are attained according to the present invention in a system wherein a strand of uniform and homogeneous cross section is extruded and is immediately pressed so as to impart to it the desired shape, forming coupling heads thereon as described in my commonly assigned U.S. Pat. No. 3,704,490. According to another feature of the invention a stretch of continuous nonextensible metal element is introduced into the strand downstream of the extruder and the strand is deformed around this element, which is removed therefrom further downstream after thermofixing and cooling of the coupling element.

The pressing operation here is a plastic deformation of the workpiece as described in (German Industrial Standard) DIN 8580, in which the pressure exerted on the workpiece causes it to flow plastically and to assume permanently the desired shape. The material of the strand is displaced and made to assume the shape of the die elements squeezed over it. This process is to be distinguished from the methods of injection molding, casting, stamping, drawing, and the like.

Advantageously according to this invention the pressing operation is carried out with the workpiece, here the strand, at a temperature above the recrystallization temperature (glass-transition or plastic-flow temperature), but not in the liquid zone.

A slide-fastener coupling element according to this invention has a very stable and precise shape. The pressing operation gives a molecularly oriented composition to the coupling heads or teeth of the element, and allows even the finest and most intricately shaped structures to be produced.

DESCRIPTION OF THE DRAWING

The above and other objects, features, and advantages of the present invention will become more readily apparent from the following description, reference being made to the accompanying drawing in which.

SPECIFIC DESCRIPTION

Figure 1:
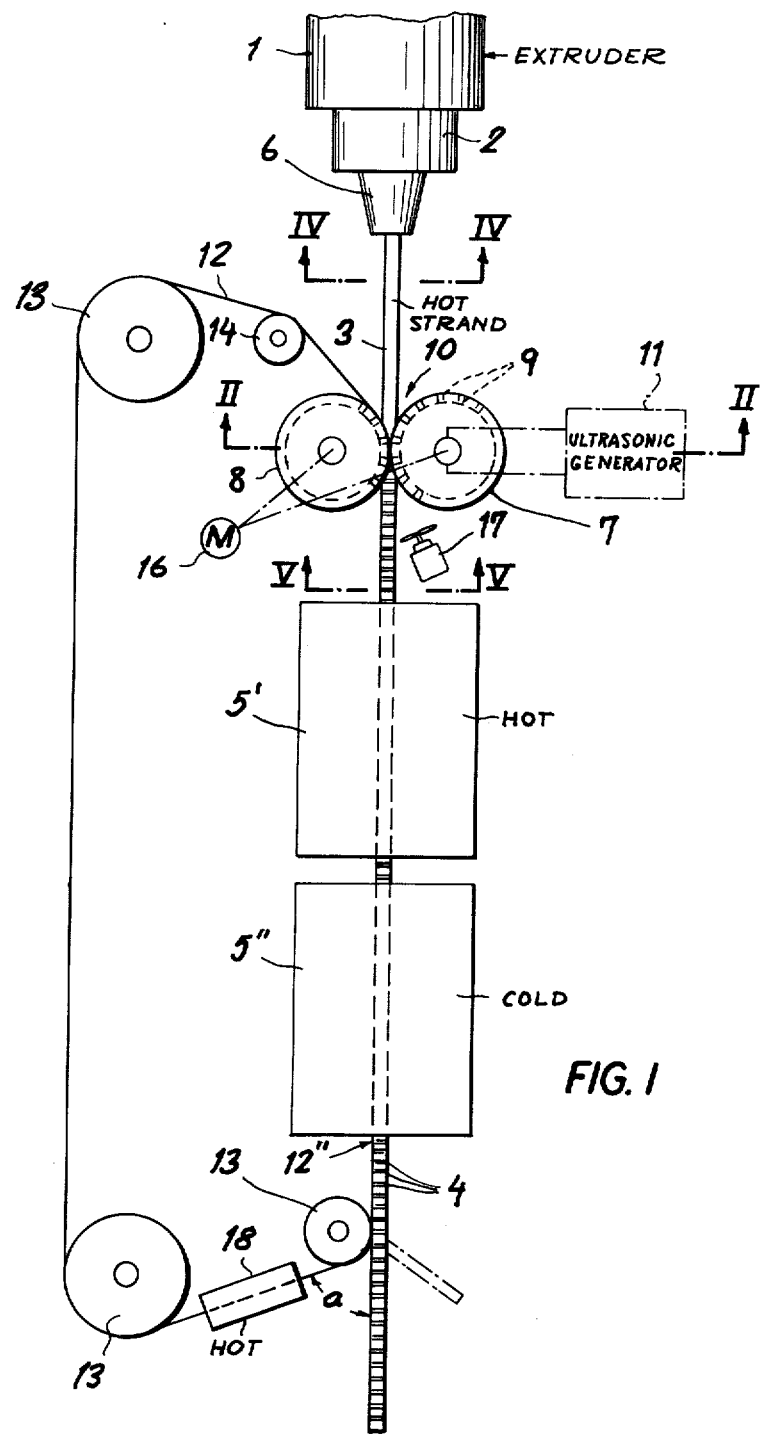
FIG. 1 is a schematic representation of the system according to this invention.
Figure 2:
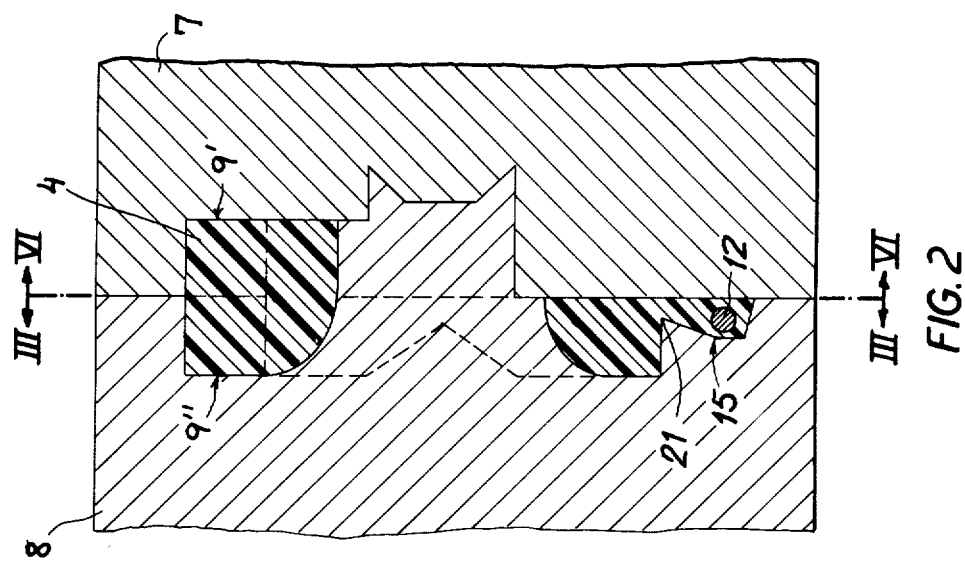
FIGS. 2, 4, and 5 are sections taken along lines II—II, IV—IV, and V—V of FIG. 1 respectively.
Figure 3:
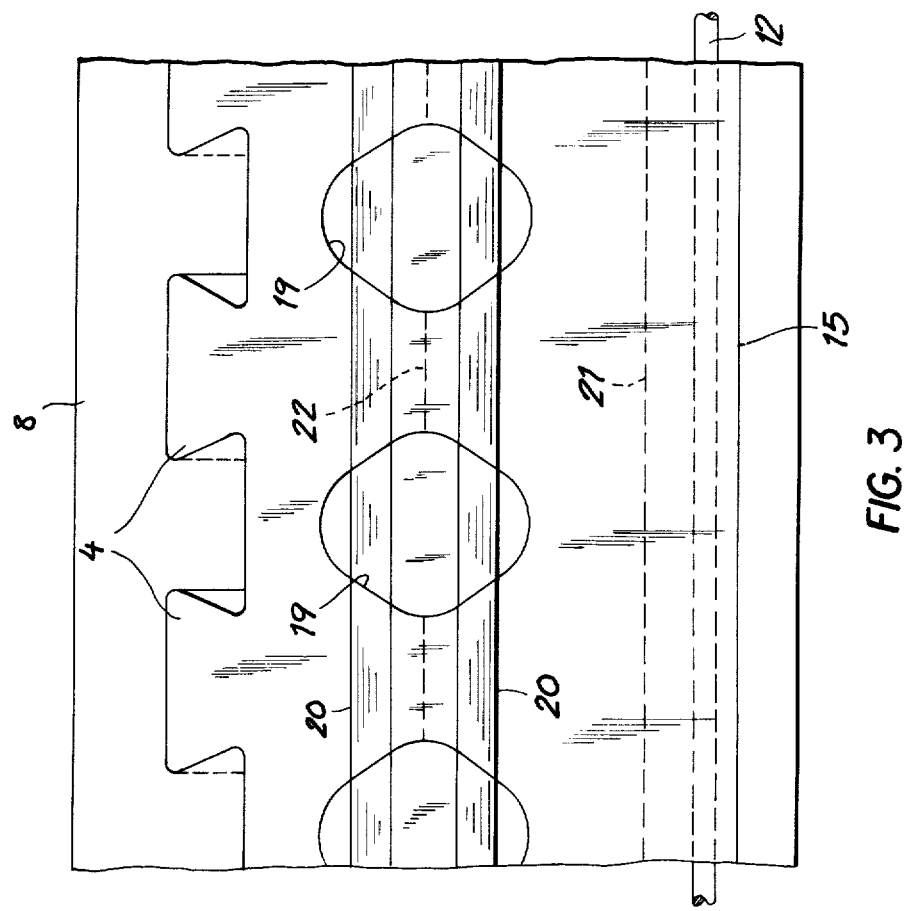
FIGS. 3 and 6 are sections taken along line III—III and VI—VI of FIG. 2, respectively, each with one of the dies removed for clarity of view and the strand shown in elevation.
Figure 4:
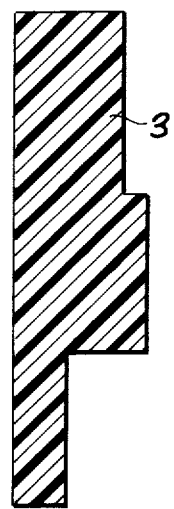
Figure 5:
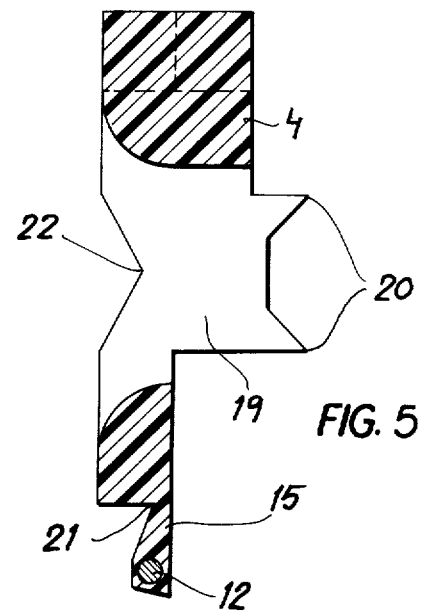
Figure 6:
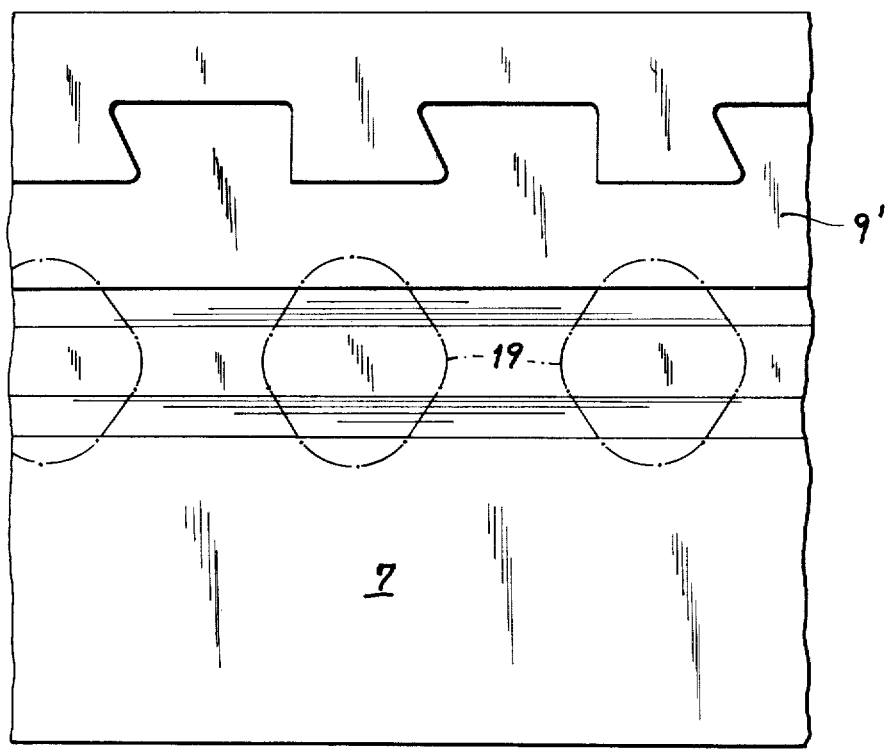

The arrangement shown in FIG. 1 comprises an extrusion apparatus 1 having a head 2 provided with a die 6 that forms a profiled synthetic-resin strand 3 having the homogeneous uniform section shown in FIG. 4. It is possible to provide a plurality of such heads and dies on a single apparatus 1 and similarly increase the capacity of the rest of the apparatus described below in order to produce a plurality of shaped coupling elements, but only a single such strand is described here.

The strand 3 directly as it issues from the die 6 enters the nip 10 between a pair of meshing and counterrotating shaping wheels 7 and 8 driven by a common drive motor 16. An ultrasonic heating device 11 is connected to both steel rollers 7 and 8 to operate the roller 7 as a so-called sonotrode and the roller 8 as an anvil (See U.S. Pat. Nos. 3,333,323, 3,302,277, 3,330,026 and 3,378,429) to insure that the strand 3 remains hot, at least above the glass-transition or recrystallization temperature. A blower 17 is provided to prevent this temperature from rising above the melting point.

An auxiliary strand 12 in the form of a closed loop of flexible steel wire is spanned over three idler rollers 13, a tensioning roller 14, and the anvil roller 8 so that if forms a straight vertical stretch 12' lying along the axis defined by the strand 3. This stretch 12' and the strand 3 that runs along with it pass through thermal treatment chambers 5' and 5'' in which the strand 3 is first heated, then cooled, respectively. In addition the wire 12 passes through a small very hot chamber 18 after leaving the chamber 5'' to burn off any synthetic-resin material clinging to it.

FIGS. 2–5 indicate how the rollers 7 and 8 are formed with respective mating formations 9' and 9'' which serve to form teeth 4, holes 19, a longitudinal groove 22, and barbs 20, much as described in my above-cited and other patents. In addition the coupling element so made is shaped along its longitudinal edge opposite to the teeth 4 with a relief zone 15 in which the wire 12 is imbedded. This zone 15 is defined by a narrow neck 21 so that it only fills up with synthetic-resin material when the teeth 4 are formed.

Below the cold chamber 5'' the wire 12 is pulled away from the strand 3 at an angle $a$ of approximately 75° so as to rip the relief zone 15 free from the strand at the narrow region 21. With some resins it is possible to tear only the wire out, but whether the zone 15 is removed or remains, the wire 12 is recovered and can be returned to the strand 3 at the rollers 7 and 8. The strand 3 can be pulled away from the stretch 12' as shown in dot-dash lines for best separation of these two.

The wire or cable 12 insures that the stretch 12' between the roll 8 and the roll 13 directly below it extends in a straight line through the two treatment chambers while it surely pulls the strand 3 out of the die formations 9. At the same time it is impossible for the finished shaped strand 3 to stretch or shrink in these chambers 5' and 5'', since the steel element 12 will hardly change length. This eliminates the problem of the strand 3 breaking, since even if the strand should accidentally become discontinuous downstream of the rolls 7 and 8, it will continue to be guided by the wire 12, and when the device is started there is no tricky problem of threading the leading end of the strand along its path. Since the die 6 of the extruder 1 is directly in line with the nip 10 of the rollers 7 and 8 the feed will be automatic. It is also possible to feed a preformed strand from a spool to the heated rollers 7 and 8 and proceed according to the invention thereafter.

I claim:

1. A method of making a slide-fastener coupling element comprising the steps of:
   continuously extruding a synthetic-resin strand of uniform and homogeneous cross-section at a plastic-deformation temperature above the plastic-flow temperature of the resin and below the melting point thereof;
   pressing said strand while it is still at a plastic-deformation temperature at a pressing station into a shape having coupling heads prior to cooling of said strand below said plastic-flow temperature;
   continuously embedding an inextensible continuous element of a material other than that of said strand and in the form of a section of a loop of flexible element into said synthetic-resin strand at said pressing station concurrently with the pressing thereof into said shape;
   thereafter continuously passing the strand united with said element through a treatment station downstream of said pressing station to harden said strand; and
   thereafter continuously separating said inextensible element from said synthetic-resin strand.

2. The method defined in claim 1 wherein said strands are heated and cooled in said treatment station.

3. The method defined in claim 1 wherein said element is an endless loop of metal wire.

4. The method defined in claim 3 wherein said strand is formed at said pressing station with a continuous weakened zone along a side of the strand, said wire being pressed into said weakened zone and said weakened zone being torn off from the remainder of said strand upon separation of said wire therefrom.

* * * * *